United States Patent
Spears

(10) Patent No.: US 6,991,268 B2
(45) Date of Patent: Jan. 31, 2006

(54) PIPE FITTING HAVING OVER-SIZED STRENGTHENED STARTER THREADS

(75) Inventor: Wayne Spears, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 69 days.

(21) Appl. No.: 10/826,844

(22) Filed: Apr. 16, 2004

(65) Prior Publication Data

US 2004/0256856 A1 Dec. 23, 2004

Related U.S. Application Data

(63) Continuation-in-part of application No. 10/189,702, filed on Jul. 3, 2002, now Pat. No. 6,866,305.

(51) Int. Cl.
F16L 25/00 (2006.01)

(52) U.S. Cl. .................. 285/334.4; 285/333; 285/329; 285/392

(58) Field of Classification Search ............... 285/333, 285/422, 390, 423, 329, 334.4, 392
See application file for complete search history.

(56) References Cited

U.S. PATENT DOCUMENTS

| | | | | |
|---|---|---|---|---|
| 597,000 | A * | 1/1898 | Higbee | 285/333 |
| 2,086,133 | A * | 7/1937 | Kennedy | 285/349 |
| 2,102,072 | A | 12/1937 | Hinderliter | |
| 2,104,799 | A | 1/1938 | Evans | |
| 2,179,202 | A * | 11/1939 | Simpson | 285/355 |
| 2,183,644 | A * | 12/1939 | Frame | 285/333 |
| 2,380,690 | A * | 7/1945 | Graham | 285/114 |
| 3,079,181 | A * | 2/1963 | Van Der Wissel | 285/333 |
| 3,167,333 | A | 1/1965 | Hall et al. | |
| 3,545,794 | A | 12/1970 | Wise et al. | |
| 3,712,631 | A | 1/1973 | Forchini et al. | |
| 4,121,862 | A * | 10/1978 | Greer | 285/333 |
| 4,428,602 | A | 1/1984 | Lambot et al. | |
| 4,576,402 | A | 3/1986 | Murray et al. | |
| 4,588,213 | A * | 5/1986 | Bollfrass et al. | 285/187 |
| 4,682,797 | A | 7/1987 | Hildner | |
| 4,919,461 | A | 4/1990 | Reynolds | |
| 5,083,821 | A | 1/1992 | Friend | |
| 5,109,929 | A | 5/1992 | Spears | |
| 5,215,341 | A | 6/1993 | Namakura et al. | |
| 5,221,113 | A * | 6/1993 | Stoll | 285/333 |
| 5,437,086 | A | 8/1995 | Murphree | |
| 5,437,481 | A | 8/1995 | Spears et al. | |
| 6,186,558 | B1 * | 2/2001 | Komolrochanaporn | 285/148.19 |
| 6,361,083 | B1 | 3/2002 | Riesselmann et al. | |

OTHER PUBLICATIONS

Spears Manufacturing Co. Brochure, "PVC & CPVC Transition Adapters," BR-2-0393, Feb. 1993.
Spears Manufacturing Co. Brochure, "CPVC Schedule 80 and 150 Series Large Diameter Fittings," 800C-0293, Printed Jan. 1993.

(Continued)

*Primary Examiner*—David Bochna

(57) ABSTRACT

A pipe fitting has a body with an internally threaded bore and at least one female starter thread. The at least one female starter thread is disposed either within the bore or immediately outside of the bore. The starter thread is axially aligned with the bore threads. The starter thread is made from a material which is stronger than the material from which the bore threads are made. The starter thread most proximate to the threads of the internally threaded bore has a pitch diameter which is at least two percent greater than the pitch diameter of the most proximate thread within the internally threaded bore.

3 Claims, 3 Drawing Sheets

OTHER PUBLICATIONS

Spears Manufacturing Co. Brochure, "CPVC Schedule 80 and 150 Series Large Diameter Fittings," 800C-0293A, Printed Jan. 1993.

Spears Manufacturing Co. Brochure. "BlazeMaster Fire Sprinkler Piping Products" List Price Schedule, FS-1-0692, Printed Apr. 1992.

* cited by examiner

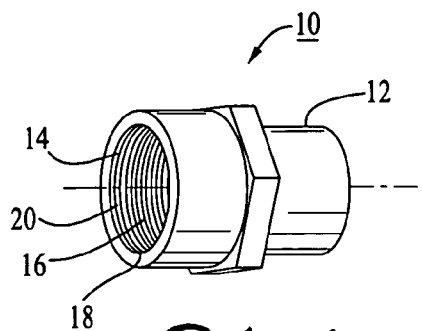
FIG. 1
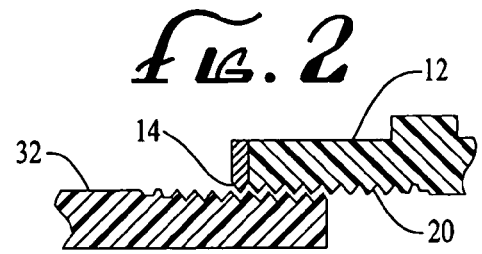
FIG. 2
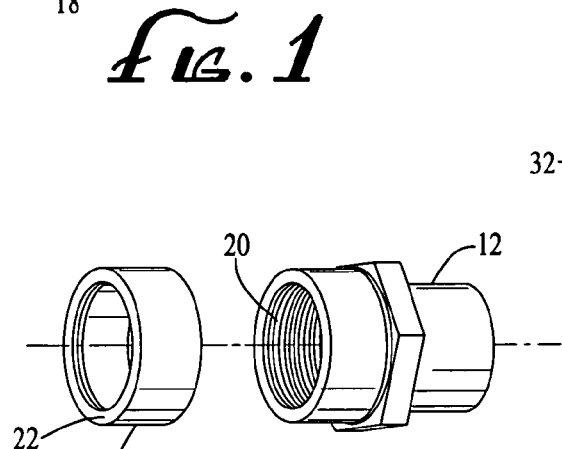
FIG. 4
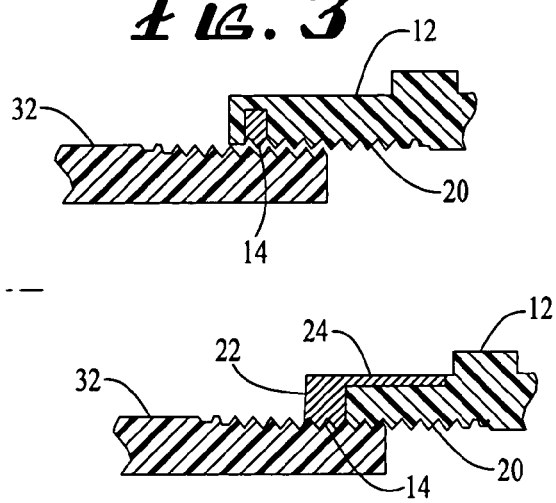
FIG. 3
FIG. 5
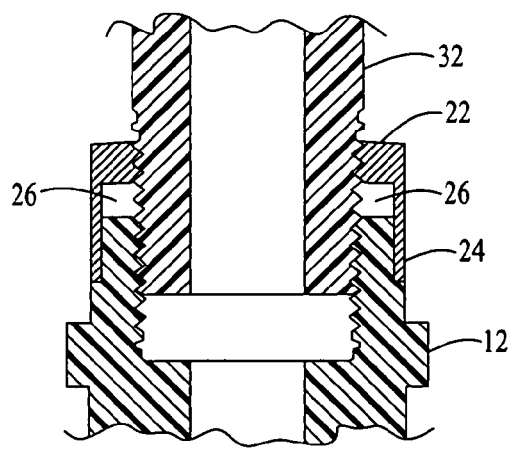
FIG. 6
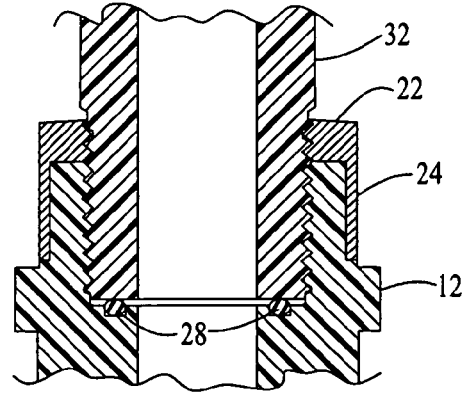
FIG. 7

PIPE FITTING HAVING OVER-SIZED STRENGTHENED STARTER THREADS

RELATED APPLICATIONS

This application is a continuation-in-part of U.S. patent application Ser. No. 10/189,702, filed Jul. 3, 2002, now U.S. Pat No. 6,866,305, entitled Pipe Fitting Having Strengthened Starter Threads, the entirety of which is incorporated herein by this references.

FIELD OF THE INVENTION

The present invention is directed to pipe fittings and, more specifically, to pipe fittings having tapered threads.

BACKGROUND OF THE INVENTION

Pipe fittings, including hollow, tubular shaped pipe fittings having connector ends with either internal threads (commonly referred to as female pipe threads) or external threads (commonly referred to as male pipe threads) are exceedingly popular in liquid and gas piping systems. Typically, male pipe threads of a first pipe fitting are threaded into female pipe threads of a second pipe fitting to form a pipe joint.

The use of male and female pipe threads is also exceedingly popular where the pipes and pipe fittings are made from lightweight materials, such as plastics. In such pipes and pipe fittings, however, there is a problem with the use of the pipe fittings. This problem arises from the fact that pipe threads made from lightweight materials have a tendency to "cross thread." That is, if the male pipe threads are not precisely aligned with the female pipe threads as the male pipe threads are initially threaded into the female pipe threads, the male pipe threads can easily become misaligned with the female pipe threads. Such cross-threading tends to ruin one or both sets of pipe threads and cannot seal the pipe joint.

In my previously filed patent application Ser. No. 10/189,702, I disclosed and claimed a pipe fitting having at least one female starter thread which is stronger than the material from which the pipe fitting has been manufactured. This invention is a major advancement in preventing cross-threading. However, there remains room for improvement. For example, in pipe fittings having tapered internal threads, it has been typical for the taper of both the starter threads and the softer, sealing threads of the pipe fitting to be of a single, constant angle of taper. However, when such a pipe fitting is mated with an externally threaded pipe of like taper, the starter threads provide interference simultaneously with the mating of the external threads with the sealing threads within the pipe fitting. The interference between the starter threads and the external threads often prevents the positive mating of the external threads with the sealing threads. This can result in leaking between the external threads and the sealing threads.

Accordingly, there is a need for an improved pipe fitting which avoids the aforementioned problems in the prior art.

SUMMARY

The invention satisfies this need. The invention is a pipe fitting comprising (a) a body having a bore terminating in a bore opening, the bore opening being threaded with a plurality of internal tapered bore threads of a first material, the tapered bore threads having successively smaller threaded bore thread pitch diameters and include a first tapered bore thread which is disposed closest to the bore opening and which has a pitch diameter which is larger than that of the other tapered bore threads, and (b) at least one starter thread disposed either within the bore and being closer to the bore opening than the tapered bore threads or being disposed immediately outside of the bore, the at least one starter thread being axially aligned with the tapered bore threads and being of a second material which is stronger than the first material, the at least one starter thread including a last tapered starter thread disposed closest to the tapered bore threads. In the invention, the last tapered starter thread has a pitch diameter which is at least 2% greater than the pitch diameter of the first tapered bore thread.

In one embodiment of the invention, the at least one starter thread is a plurality of starter threads having successively smaller tapered starter thread pitch diameters. In a preferred version of this embodiment, the starter threads comprise a first group of contiguous starter threads and a second group of contiguous starter threads. The bore threads and the first group of starter threads are tapered at a first angle, while the second group of contiguous starter threads are tapered at a second angle which is greater than the first angle.

DRAWINGS

These and other features, aspects and advantages of the present invention will become better understood with reference to the following description, appended claims and accompanying drawings where:

FIG. 1 is an isometric drawing of a first pipe fitting having features of the invention;

FIG. 2 is a detail cross-sectional side view of a first pipe joint using a fitting having features of the invention;

FIG. 3 is a detail cross-sectional side view of a second pipe joint using a fitting having features of the invention;

FIG. 4 is an exploded isometric view of another pipe joint having features of the invention;

FIG. 5 is a detail cross-sectional side view of a pipe joint employing the pipe fitting illustrated in FIG. 4;

FIG. 6 is a detail cross-sectional view of yet another pipe joint having features of the invention;

FIG. 7 is a detail cross-sectional view of still another pipe joint having features of the invention;

DETAILED DESCRIPTION

Figure 8:
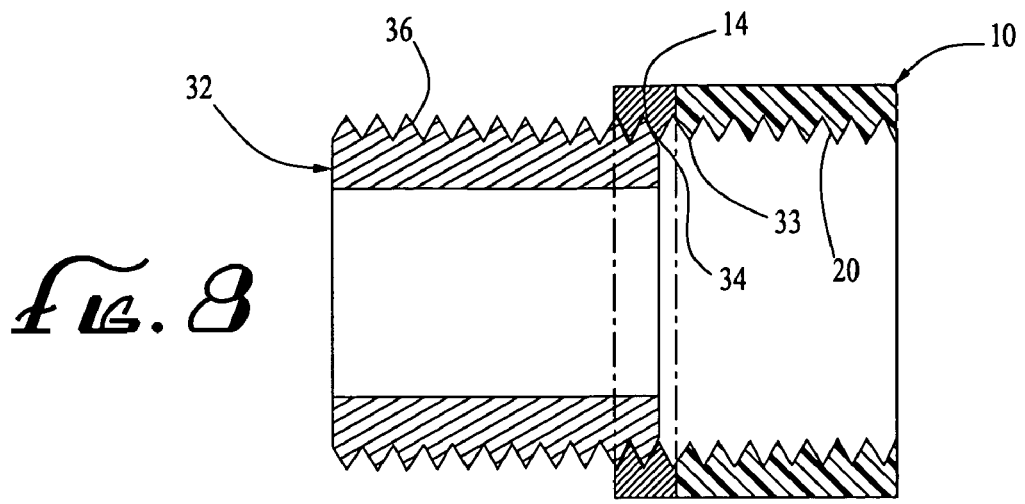
FIG. 8 is a cross-section of a second pipe fitting having features of the invention, the second pipe fitting being shown in the initial stages of being mated with an externally threaded pipe.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a pipe fitting 10 having an internally threaded body 12 with at least one female starter thread 14.

The body 12 can be any of the myriad of shapes for pipe bodies known in the art. In the drawings, the pipe fitting 10 is a typical swaged pipe coupling for coupling a pipe having external threads of a first diameter with a pipe having external threads of a lesser diameter.

The body 12 has at least one open bore 16 terminating in a bore opening 18. The bore 16 is internally threaded with internal bore threads 20.

The bore threads 20 are of a first material. Typically, the bore threads 20 are of the same material as the body 12, having been formed directly into the internal walls of the bore 16. In most common embodiments, the body 12 is made from a plastic and the bore threads 20 are plastic.

The at least one female starter thread 14 is disposed either within the bore 16 or immediately outside of the bore 16. When disposed within the bore 16, the at least one female starter thread 14 is disposed closer to the bore opening 18 than the bore threads 20. When disposed within the bore 16, the at least one female starter thread 14 is typically molded into the walls of the body 12. Other attachment means, however, can be used.

When the at least one female starter thread 14 is disposed immediately outside of the bore 16, the at least one female starter thread 14 is attached to the body 12 by any suitable connection means. In the embodiment illustrated in FIG. 3, the at least one female starter thread 14 is attached to the body 12 by being molded to the body 12. In the embodiment illustrated in FIG. 2, the at least one female starter thread 14 is attached to the body 12 by adhesives, by welding or by mechanical connection means, such as clamps, clips, threads or press-fit.

In the embodiment illustrated in FIGS. 4 and 5, the at least one female starter thread 14 is disposed in a lip 22 of a band 24 which partially circumscribes that portion of the body 12 defining the open bore 16. This embodiment is ideal for use in a strengthened pipe fitting, such as the pipe fitting described in U.S. Pat. No. 5,582,439, the entirety of which is incorporated herein by this reference.

FIG. 6 illustrates another embodiment of the invention. In FIG. 6, the at least one starter thread 14 is spaced apart from the internal bore threads 20 by a short distance so as to define a gap 26 between the at least one starter thread 14 and the internal bore threads 20. The gap 26 is greater in distance than the distance between adjacent internal bore threads 20.

FIG. 7 illustrates yet another embodiment of the invention. In the embodiment illustrated in FIG. 7, an O-ring or other resilient sealing element 28 is disposed in a shoulder 30 within the bore 16 such that, when a threaded length of pipe 32 is threadedlyy disposed into the bore 16, the forward-most end of the length of pipe 32 can be disposed in contact with the O-ring or other resilient sealing element 28 so as to further seal the pipe 32 to the fitting 10. The O-ring or other resilient sealing element 28 can have any appropriate shape. Typically, the O-ring or other resilient sealing element 28 has a cross-section which is either round, rectangular or essentially flat.

In all cases, the at least one female starter thread 14 is axially aligned with the bore threads 20 so that the end of an externally threaded pipe end 32 having a matching diameter to that of the tapered bore threads 20 can be smoothly and properly engaged within the bore threads 20 after initially engaging the at least one starter thread 14.

The at least one starter thread 14 is made from a second material which is stronger than the material of the bore threads 20. By "stronger," it is meant that the material of the at least one starter thread 14 is harder, more rigid or less ductile than the bore threads 20. This protects all of the bore threads 20. In one embodiment, the bore threads 20 are made of a first metal and the at least one starter thread 14 is made from a stronger metal. In a typical embodiment, the bore threads 20 are made of plastic and the at least one starter thread 14 is made of a metal. Because the material of the at least one starter thread 14 is stronger than the material of the bore threads 20, the use of the at least one starter thread 14 virtually eliminates the danger of cross-threading.

The at least one starter thread 14 can be relatively small in length. For example, for a one-half inch pipe, the at least one starter thread 14 can be as short as 0.0618 inches. This would provide a "blunt start" as defined by the American Society of Testing Materials ("ASTM"). The length of the at least one starter thread 14 is not particularly important so long as it is not so long as to prevent the engagement of the bore threads 20 with the male threads of the threaded length of pipe 32 which is to be threadedly disposed within the bore 16.

In the invention, as best understood with reference to FIGS. 8–11, the plurality of internal bore threads 20 are tapered, having successively smaller pitch diameters as the threads 20 are disposed progressively farther from the first tapered bore thread 33 which is disposed nearest to the bore opening 18. There is at least one starter thread 14 disposed within the bore 16 which is closer to the bore opening 18 than the bore threads 20 or which is disposed immediately outside the bore 16. The at least one starter thread 14 is axially aligned with the bore threads 20. The at least one starter thread 14 includes a last starter thread 34 disposed closest to the bore threads 20. The last starter thread 34 has a pitch diameter which is at least 2% greater than the pitch diameter of the first tapered bore thread 33.

As illustrated in FIGS. 8–11, the at least one starter thread 14 can be a plurality of starter threads having successfully smaller tapered pitch diameters as the starter threads 14 become disposed closer to the bore threads 20. Typically, most of the starter threads 14 are tapered at the same angle of taper as the bore threads 20. However, if all of the starter threads 14 are tapered at the same angle of taper as the bore threads 20, both the tapered threads 14 and the bore threads 20 will simultaneously interfere with a connected pipe portion 32 having male threads 36 tapered disposed at a matching angle. The simultaneous interference of the harder starter threads 14 tends to prevent the positive mating of the connecting pipe threads 36 with the bore threads 20.

Thus, it is preferred that the starter threads 14 comprise a first group of contiguous starter threads 38 and a second group of contiguous starter threads 40. The second group of contiguous starter threads 40 includes the last starter thread 34. As diagrammatically illustrated in FIG. 11, the threaded bore threads 20 and the first group of contiguous threaded starter threads 38 are tapered at a first angle while the second group of contiguous threaded starter threads 40 are tapered at a second angle. The second angle is greater than the first angle.

Making the taper of the second group of contiguous starter threads 40 greater than the taper of the mating male threads 36 causes interference at the deepest mating male thread 36 first. Making the taper discontinuous in the starter threads 14 allows for an increase in taper or diameter at the transition between the bore threads 20 and the starter threads 14 to ensure interference occurs first in the bore threads 20, thus to effect the seal to the bore threads 20 before interference occurs in the starter threads 14.

The difference in pitch diameter can also be used to reduce over-tightening into the softer bore threads 20. By precisely controlling the differences in pitch diameter, a sudden increase in assembly torque required can be developed after the softer material of the bore threads 20 expands.

Figure 9A:
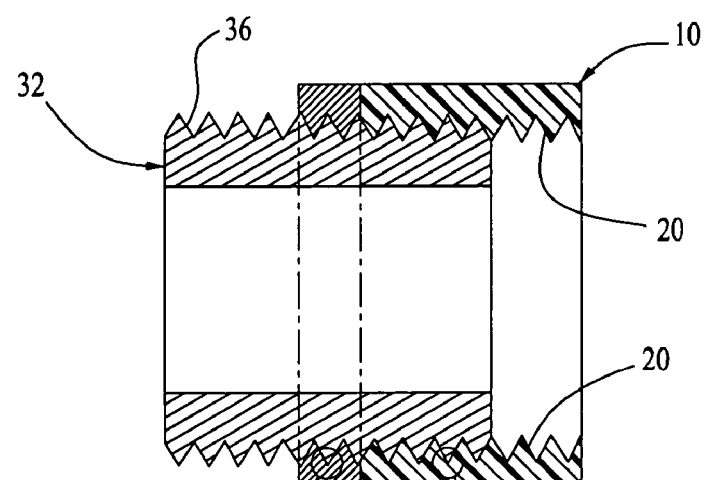
FIG. 9A is a cross-section of the pipe fitting illustrated in FIG. 8 showing the externally threaded pipe partially disposed within the bore of the pipe fitting.
Figures 9B, 9C:
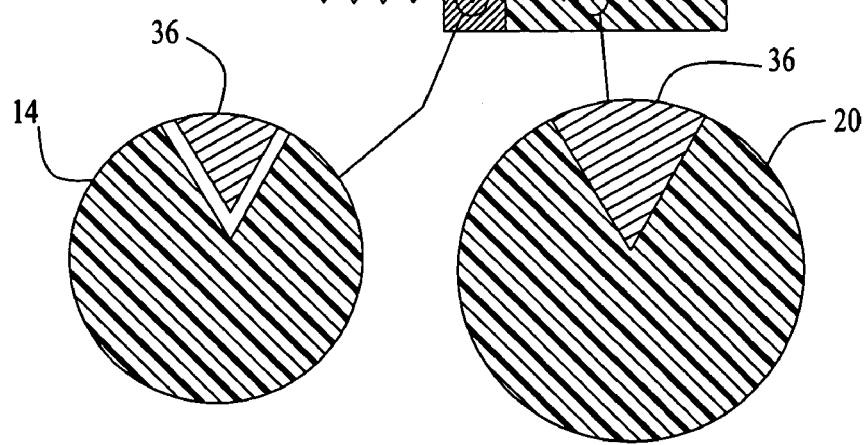
FIG. 9B is a detailed cross-section of one root of one of the starter threads in the pipe fitting illustrated in FIG. 9A.
FIG. 9C is a detailed drawing of one root of a non-starter thread in the pipe fitting illustrated in FIG. 9A.

Regarding the embodiment described immediately above, the forward-most end of a length of pipe 32 can be engaged into the pipe fitting 10 of the invention by threading the forward-most end of the length of pipe 32 into the starter threads 14 of the pipe fitting 10, as illustrated in FIG. 8. Thereafter, the forward-most length of the pipe 32 is further threaded into the pipe fitting 10 of the invention until the threads 36 of the forward-most end of the pipe 32 are engaged with the sealing bore threads 20 within the bore 16 of the pipe fitting 10. This is illustrated in FIG. 9A. FIG. 9B illustrates the fact that the threads 36 of the length of pipe 32 are, at this juncture, only loosely retained within the starter threads 14. FIG. 9C, however, illustrates that the threads 36 of the length of pipe 32 are at this point beginning to interfere with the sealing threads 20 within the bore 16 of the pipe fitting 10.

Figures 10A, 10B, 10C:
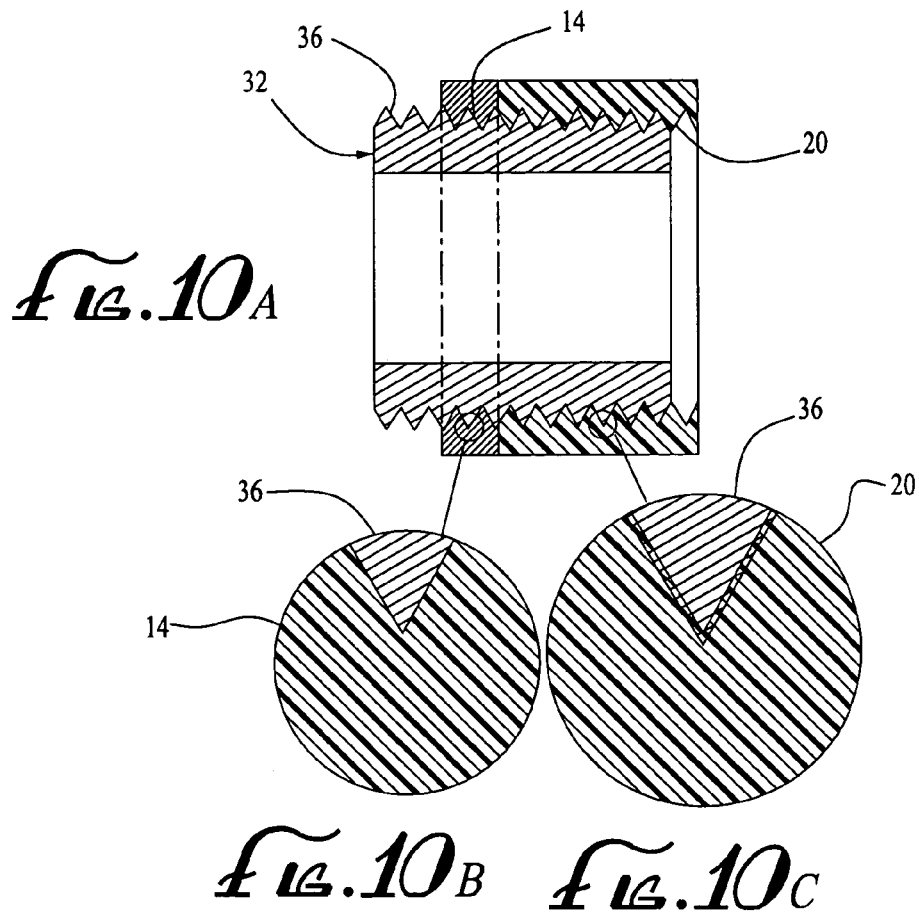
FIG. 10A is a cross-section of the pipe fitting illustrated in FIG. 8 showing the externally threaded pipe fully disposed within the bore of the pipe fitting.
FIG. 10B is a detailed cross-section of one root of one of the starter threads in the pipe fitting illustrated in FIG. 10A.
FIG. 10C is a detailed drawing of one root of a non-starter thread in the pipe fitting illustrated in FIG. 10A.
Figure 11:
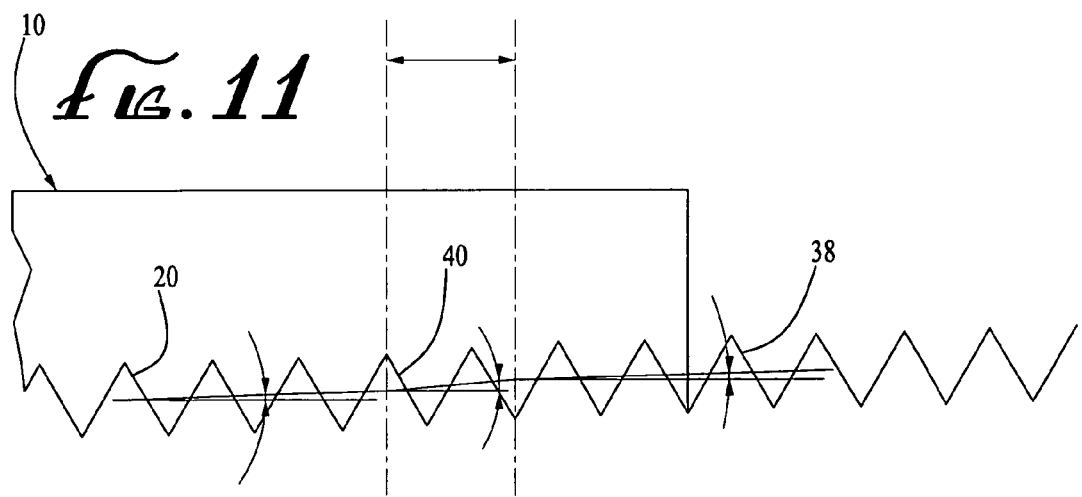
FIG. 11 is a diagrammatic representation of the threads of a pipe fitting having features of the invention, showing three different angles of taper.

As the length of pipe 32 is continued to be threaded into the bore 16 of the pipe fitting 10, as illustrated in FIG. 10A, the starter threads 14 finally begin to interfere with the threads 36 of the length of pipe 32, as illustrated in FIG. 10B. However, as illustrated in FIG. 10C, the forward-most threads 36 on the length of pipe 32 have, by this time, fully mated with the sealing threads 20 within the bore 16 of the pipe fitting 10 to form a tight, leak resistant seal with the sealing threads 20.

EXAMPLE

In one example of the invention, a pipe fitting 10 is provided having a one-half inch female NPT thread 20 and a metal starting thread 14 with a width equal to two full turns. The sealing threads 20 within the bore 16 of the pipe fitting 10 are made of a soft plastic material. The sealing threads 20 are disposed at an angle of taper of 1°, 47 minutes with centerline. The pitch diameter of the first sealing thread 33 is 0.77843 inches (ANSI B 2.1-1968 gauging notch and tight plane). The taper in the second group of starter threads 40 is 5°, 21 minutes for 0.107 inches. The taper in the first group of starter threads 38 is 1°, 47 minutes. The pitch diameter of the last starter thread 34 is 0.798 inches.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A pipe fitting comprising:
 (a) a body having a bore terminating in a bore opening, the bore opening being threaded with a plurality of internal tapered bore threads of a first material, the tapered bore threads having successively smaller threaded bore thread pitch diameters and include a first tapered bore thread which is disposed closest to the bore opening and which has a pitch diameter which is larger than that of the other tapered bore threads; and
 (b) at least one starter thread disposed either within the bore and being closer to the bore opening than the tapered bore threads or being disposed immediately outside of the bore, the at least one starter thread being axially aligned with the tapered bore threads and being of a second material which is stronger than the first material, the at least one starter thread including a last tapered starter thread disposed closest to the tapered bore threads;

wherein the last starter thread has a pitch diameter which is at least 2% greater than the pitch diameter of the first bore thread.

2. A pipe fitting comprising:
 (a) a body having a bore terminating in a bore opening, the bore opening being threaded with a plurality of internal tapered bore threads of a first material, the tapered bore threads having successively smaller threaded bore thread pitch diameters and include a first tapered bore thread which is disposed closest to the bore opening and which has a pitch diameter which is larger than that of the other tapered bore threads; and
 (b) a plurality of tapered starter threads disposed, either within the bore and being closer to the bore opening than the tapered bore threads or being disposed immediately outside of the bore, the tapered starter threads being axially aligned with the tapered bore threads and being of a second material which is stronger than the first material, the tapered starter threads having successively smaller tapered starter thread pitch diameters and including a last tapered starter thread disposed closest to the tapered bore threads and which has a pitch diameter which is smaller than that of the other tapered starter threads;

wherein the last tapered starter thread has a pitch diameter which is at least 2% greater than the pitch diameter of the first tapered bore thread.

3. A pipe fitting comprising:
 (a) a body having a bore terminating in a bore opening, the bore opening being threaded with a plurality of internal tapered bore threads of a first material, the tapered bore threads having successively smaller threaded bore thread pitch diameters and include a first tapered bore thread which is disposed closest to the bore opening and which has a pitch diameter which is larger than that of the other tapered bore threads; and
 (b) a plurality of tapered starter threads disposed either within the bore and being closer to the bore opening than the tapered bore threads or being disposed immediately outside of the bore, the tapered starter threads being axially aligned with the tapered bore threads and being of a second material which is stronger than the first material, the tapered starter threads having successively smaller tapered starter thread pitch diameters and including a last tapered starter thread disposed closest to the tapered bore threads and which has a pitch diameter which is smaller than that of the other tapered starter threads;

wherein the last tapered starter thread has a pitch diameter which is at least 2% greater than the pitch diameter of the first tapered bore thread; and wherein the tapered starter threads comprise a first group of contiguous tapered starter threads and a second group of contiguous tapered starter threads, the second group of contiguous tapered starter threads including the last tapered starter thread, and wherein the tapered bore threads and the first group of contiguous tapered starter threads are tapered at a first angle and the second group of contiguous tapered starter threads are tapered at a second angle which is greater than the first angle.

\* \* \* \* \*